US012710309B2

(12) United States Patent
Nakamura et al.

(10) Patent No.: US 12,710,309 B2
(45) Date of Patent: Aug. 18, 2026

(54) PHOTOELECTRIC SENSOR HAVING INDICATOR LAMPS ON MULTIPLE SURFACES PROVIDING COORDINATED INDICATION OF ON-OFF STATE AND WORKPIECE DETECTION STATE

(71) Applicant: OMRON Corporation, Kyoto (JP)

(72) Inventors: Jumpei Nakamura, Kyoto (JP); Yuta Ikusaka, Kyoto (JP); Ryosuke Tsuzuki, Kyoto (JP); Heita Nada, Kyoto (JP); Takehisa Hirose, Kyoto (JP); Kazunari Komai, Kyoto (JP)

(73) Assignee: OMRON Corporation, Kyoto (JP)

(*) Notice: Subject to any disclaimer, the term of this patent is extended or adjusted under 35 U.S.C. 154(b) by 91 days.

(21) Appl. No.: 18/817,004

(22) Filed: Aug. 27, 2024

(65) Prior Publication Data

US 2025/0076107 A1 Mar. 6, 2025

(30) Foreign Application Priority Data

Sep. 1, 2023 (JP) ................................ 2023-142187
Aug. 22, 2024 (JP) ................................ 2024-140583

(51) Int. Cl.

| | |
|---|---|
| ***G01J 1/02*** | (2006.01) |
| ***G01S 7/51*** | (2006.01) |
| ***G01S 17/04*** | (2020.01) |

(52) U.S. Cl.

CPC ............... *G01J 1/0271* (2013.01); *G01S 7/51* (2013.01); *G01S 17/04* (2020.01)

(58) Field of Classification Search

CPC .......... G01J 1/0271; G01S 7/51; G01S 17/04; G01S 7/481; G01S 7/4813; G01S 17/08; H01H 13/70; H01H 35/00; H01H 9/181

See application file for complete search history.

(56) References Cited

U.S. PATENT DOCUMENTS 10,149,460 B1 * 12/2018 Lill ...................... A01K 27/009
10,466,079 B2 * 11/2019 Komai ................. G01D 11/245

(Continued)

FOREIGN PATENT DOCUMENTS

CN 211690012 * 12/2019
JP 2012-119335 A 6/2012

(Continued)

OTHER PUBLICATIONS

Office Action in Korean Patent Application No. 10-2024-0114324, dated Nov. 27, 2025, 11 pages.

*Primary Examiner* — Tony Ko
(74) *Attorney, Agent, or Firm* — Seed Intellectual Property Law Group LLP

(57) ABSTRACT

A photoelectric sensor includes an indicator lamp that is easily visible in any direction. A photoelectric sensor (1) includes a housing (10) having a first surface (e.g., a top surface 15) and a second surface (e.g., a bottom surface 16) opposite to the first surface, and a first indicator lamp (31) and a second indicator lamp (32) that redundantly indicate information about a state of the photoelectric sensor (1). The first indicator lamp (31) is located on the first surface, and the second indicator lamp (32) is located on the second surface. The first surface and the second surface are parallel to each other. The information indicated redundantly is at least one of an on-off state of a power supply or a workpiece detection state.

9 Claims, 13 Drawing Sheets

(56) References Cited

U.S. PATENT DOCUMENTS

| | | | | |
|---|---|---|---|---|
| 2019/0101561 | A1* | 4/2019 | Nakashima | G01S 17/02 |
| 2019/0101667 | A1 | 4/2019 | Nakashima et al. | |

FOREIGN PATENT DOCUMENTS

| | | | |
|---|---|---|---|
| JP | 2019067651 | A | 4/2019 |
| JP | 2021-168270 | A | 10/2021 |

* cited by examiner

FIG. 7

| | Power supply on<br>Output on | Power supply on<br>Output off | Power supply off<br>Output off |
|---|---|---|---|
| First indicator lamp<br>Power-communication indicator lamp<br>(green) | On | On | Off |
| First indicator lamp<br>Operation indicator lamp<br>(orange) | On | Off | Off |
| Second indicator lamp<br>Power-communication indicator lamp<br>(green) | On | On | Off |
| Second indicator lamp<br>Operation indicator lamp<br>(orange) | On | Off | Off |

FIG. 8

| | Power supply on<br>Output on | Power supply on<br>Output off | Power supply off<br>Output off |
|---|---|---|---|
| First indicator lamp<br>Power-communication indicator lamp<br>(green) | On | On | Off |
| First indicator lamp<br>Operation indicator lamp<br>(orange) | On | Off | Off |
| Second indicator lamp<br>Power-communication indicator lamp also serving as operation indicator lamp | Orange | Green | Off |

FIG. 9

| | Power supply on<br>Output on | Power supply on<br>Output off | Power supply off<br>Output off |
|---|---|---|---|
| First indicator lamp<br>Power-communication indicator lamp<br>(turn-off mode) | Off | Off | Off |
| First indicator lamp<br>Operation indicator lamp<br>(turn-off mode) | Off | Off | Off |
| Second indicator lamp<br>Power-communication indicator lamp also serving as operation indicator lamp | Orange | Green | Off |

FIG. 10

| | Power supply on<br>Output on | Power supply on<br>Output off | Power supply off<br>Output off |
|---|---|---|---|
| First indicator lamp<br>Power-communication indicator lamp<br>(green) | On | On | Off |
| First indicator lamp<br>Operation indicator lamp<br>(orange) | On | Off | Off |
| Second indicator lamp<br>Power-communication indicator lamp also serving as operation indicator lamp<br>(wavelength-off mode) | Orange<br>(light with specific wavelength turned off) | Green<br>(light with specific wavelength turned off) | Off |

FIG. 11

| | Power supply on<br>Output on | Power supply on<br>Output off | Power supply off<br>Output off |
|---|---|---|---|
| First indicator lamp<br>Power-communication indicator lamp<br>(turn-off mode) | Off | Off | Off |
| First indicator lamp<br>Operation indicator lamp<br>(turn-off mode) | Off | Off | Off |
| Second indicator lamp<br>Power-communication indicator lamp also serving as operation indicator lamp | Off | Off | Off |

FIG. 12

| | Power supply on<br>Output on | Power supply on<br>Output off | Power supply off<br>Output off |
|---|---|---|---|
| First indicator lamp<br>Power-communication indicator lamp<br>(wavelength-off mode) | Green<br>(light with specific wavelength turned off) | Green<br>(light with specific wavelength turned off) | Off |
| First indicator lamp<br>Operation indicator lamp<br>(wavelength-off mode) | Orange<br>(light with specific wavelength turned off) | Off | Off |
| Second indicator lamp<br>Power-communication indicator lamp also serving as operation indicator lamp<br>(wavelength-off mode) | Orange<br>(light with specific wavelength turned off) | Green<br>(light with specific wavelength turned off) | Off |

FIG. 13

| | Power supply on<br>Output on | Power supply on<br>Output off | Power supply off<br>Output off |
|---|---|---|---|
| First indicator lamp<br>Power-communication indicator lamp<br>(turn-off mode) | Off | Off | Off |
| First indicator lamp<br>Operation indicator lamp<br>(turn-off mode) | Off | Off | Off |
| First indicator lamp<br>Power-communication indicator lamp<br>(wavelength-off mode) | On<br>(light with specific wavelength turned off) | On<br>(light with specific wavelength turned off) | Off |
| First indicator lamp<br>Operation indicator lamp<br>(wavelength-off mode) | On<br>(light with specific wavelength turned off) | Off | Off |

PHOTOELECTRIC SENSOR HAVING INDICATOR LAMPS ON MULTIPLE SURFACES PROVIDING COORDINATED INDICATION OF ON-OFF STATE AND WORKPIECE DETECTION STATE

CROSS-REFERENCE TO RELATED APPLICATION

This application claims priority to Japanese Patent Application No. 2023-142187 filed on Sep. 1, 2023, the contents of which are incorporated herein by reference.

FIELD

The present invention relates to a photoelectric sensor.

BACKGROUND

Photoelectric sensors including an indicator lamp turn on the indicator lamp to provide, to an operator, information about, for example, the on-off state of the power supply or the workpiece detection state. Such an indicator lamp is typically located on the top surface of the housing of the photoelectric sensor, as described in, for example, Patent Literature 1. The top surface of the housing may be less visible depending on the sensor installment position. Patent Literature 2 describes a photoelectric switch including an output unit operation indicator lamp at a corner of a first housing from which a relay cable extends. The photoelectric sensor further includes a front surface operation indicator lamp located on the front surface of the first housing between a light-emitting window for a light emitter and a light-receiving window for a light receiver. The front operation indicator lamp is turned on or blinks in synchronization with the output unit operation indicator lamp.

CITATION LIST

Patent Literature

Patent Literature 1: Japanese Unexamined Patent Application Publication No. 2012-119335

Patent Literature 2: Japanese Unexamined Patent Application Publication No. 2021-168270

SUMMARY

Technical Problem

The indicator lamp located on the top surface of the housing as in, for example, Patent Literature 1 is not visible from the bottom surface. The structure described in Patent Literature 2 allows at least one of the output unit operation indicator lamp at the corner or the front surface operation indicator lamp on the front surface to be visible from a wider range, but allows none of these indicator lamps to be visible from the top surface of the first housing. Known photoelectric sensors may thus have limitations on the installation position or orientation for allowing the indicator lamp to be visible. The indicator lamp may be invisible depending on the sensor installment position.

One or more aspects of the present invention are directed to a photoelectric sensor including an indicator lamp that is easily visible in any direction.

Solution to Problem

A photoelectric sensor according to one aspect of the present disclosure includes a housing having a first surface and a second surface opposite to the first surface, and a first indicator lamp and a second indicator lamp that redundantly indicate information about a state of the photoelectric sensor. The first indicator lamp is located on the first surface, and the second indicator lamp is located on the second surface. The first surface and the second surface are parallel to each other. The information indicated redundantly is at least one of an on-off state of a power supply or a workpiece detection state.

The structure according to this aspect includes the first indicator lamp visible from an area around the first surface of the housing, and the second indicator lamp visible from an area around the second surface, allowing at least one of the indicator lamps to be easily visible in any direction. For the first surface and the second surface parallel to each other, the second surface is not visible from an area around the first surface, and the first surface is not visible from an area around the second surface. However, the first indicator lamp and the second indicator lamp can indicate the same information redundantly, or more specifically, information about at least one of the on-off state of the power supply or the workpiece detection state, which is to be indicated constantly, thus reliably providing information about the state of the photoelectric sensor to an operator.

In the above aspect, the first surface may be a top surface with a display, and the second surface may be a bottom surface.

In the structure according to this aspect, the second surface is not visible from an area around the first surface, and the first surface is not visible from an area around the second surface. However, the first indicator lamp and the second indicator lamp indicate the same information redundantly. The photoelectric sensor with this structure, installed in any direction, allows at least one of the indicator lamps to be visible.

In the above aspect, the first indicator lamp may protrude from the first surface. The second indicator lamp may protrude from the second surface.

In the structure according to this aspect, the first indicator lamp and the second indicator lamp protrude and are easily visible, thus reliably providing information about the state of the photoelectric sensor to the operator.

In the above aspect, the photoelectric sensor may further include a display board on which a display is mounted, and a power supply board connected to a power cable to supply power to an electronic component in the housing. The first indicator lamp may include a light source mounted on the display board. The second indicator lamp may include a light source mounted on the power supply board.

The structure according to this aspect includes, in addition to the first indicator lamp, the second indicator lamp mounted on the power supply board, thus eliminating an additional board for the second indicator lamp. The structure includes fewer components than a structure including a first display board for the first indicator lamp and a second display board for the second indicator lamp.

In the above aspect, the first indicator lamp and the second indicator lamp may redundantly indicate the information at a same time.

In the structure according to this aspect, the first indicator lamp and the second indicator lamp indicate the same information redundantly. The photoelectric sensor with this structure, installed in any direction in which the first indicator lamp and the second indicator lamp are not visible at the same time, reliably provides information about the state of the photoelectric sensor to the operator.

In the above aspect, the photoelectric sensor may select a mode to turn off one of the first indicator lamp or the second indicator lamp. The photoelectric sensor may select a mode to turn off light with a specific wavelength for one of the first indicator lamp or the second indicator lamp.

Light from the indicator lamps may be reflected from, for example, a wall or a ceiling and enter a light receiver as ambient light, causing the photoelectric sensor to malfunction. In the structure according to these aspects, the first indicator lamp and the second indicator lamp can indicate the same information redundantly. Thus, one of the indicator lamps located on the surface on which light from the indicator lamp may possibly turn to ambient light can be selectively turned off, or light with a specific wavelength that causes the photoelectric sensor to malfunction can be selectively turned off. This prevents the photoelectric sensor from malfunctioning.

In the above aspect, the photoelectric sensor may select a mode to turn off the first indicator lamp and/or the second indicator lamp. The photoelectric sensor may select a mode to turn off light with a specific wavelength for the first indicator lamp and/or the second indicator lamp.

In some cases, photoelectric sensors of the same model may be installed at multiple locations, or the photoelectric sensor may be reinstalled after its installation location is changed, and there may be a need to install a photoelectric sensor having an indicator lamp within a housing where the photoelectric sensor is not visible from the outside. When the photoelectric sensor is located within the housing, both light from the first surface and light from the second surface may possibly turn to ambient light. According to the above-described aspects, in the case where both light from the first surface and light from the second surface may possibly turn to ambient light, the photoelectric sensor may turn off both the first and second indicator lamps, or selectively turn off light with a specific wavelength that causes the photoelectric sensor to malfunction for both the first and second indicator lamps. In the case where either light from the first surface or light from the second surface may possibly turn to ambient light, the photoelectric sensor may selectively turn off the indicator lamp located on the surface on which light from the indicator lamp may possibly turn to ambient light, or the photoelectric sensor may selectively turn off light with a specific wavelength that causes the photoelectric sensor to malfunction, only for the indicator lamp located on the surface on which light from the indicator lamp may possibly turn to ambient light. This configuration prevents malfunctioning of the photoelectric sensor in various situations.

Advantageous Effects

The photoelectric sensor according to the above aspects of the present invention includes an indicator lamp that is easily visible in any direction.

BRIEF DESCRIPTION OF THE DRAWINGS

FIG. 7 is a table showing an example configuration of the first indicator lamp and the second indicator lamp that can indicate the same information redundantly.

FIG. 8 is a table showing another configuration of the first indicator lamp and the second indicator lamp that can indicate the same information redundantly.

FIG. 9 is a table showing an example turn-off mode to turn off one of the first indicator lamp or the second indicator lamp.

FIG. 10 is a table showing an example wavelength-off mode to turn off light with a specific wavelength for one of the first indicator lamp or the second indicator lamp.

FIG. 11 is a table showing an example turn-off mode to turn off the first indicator lamp and/or the second indicator lamp.

FIG. 12 is a table showing an example wavelength-off mode to turn off light with a specific wavelength for the first indicator lamp and/or the second indicator lamp.

FIG. 13 is a table showing the configuration of a photoelectric sensor according to a modification, without including the second indicator lamp, that can select the wavelength-off mode.

DETAILED DESCRIPTION

Figure 1:
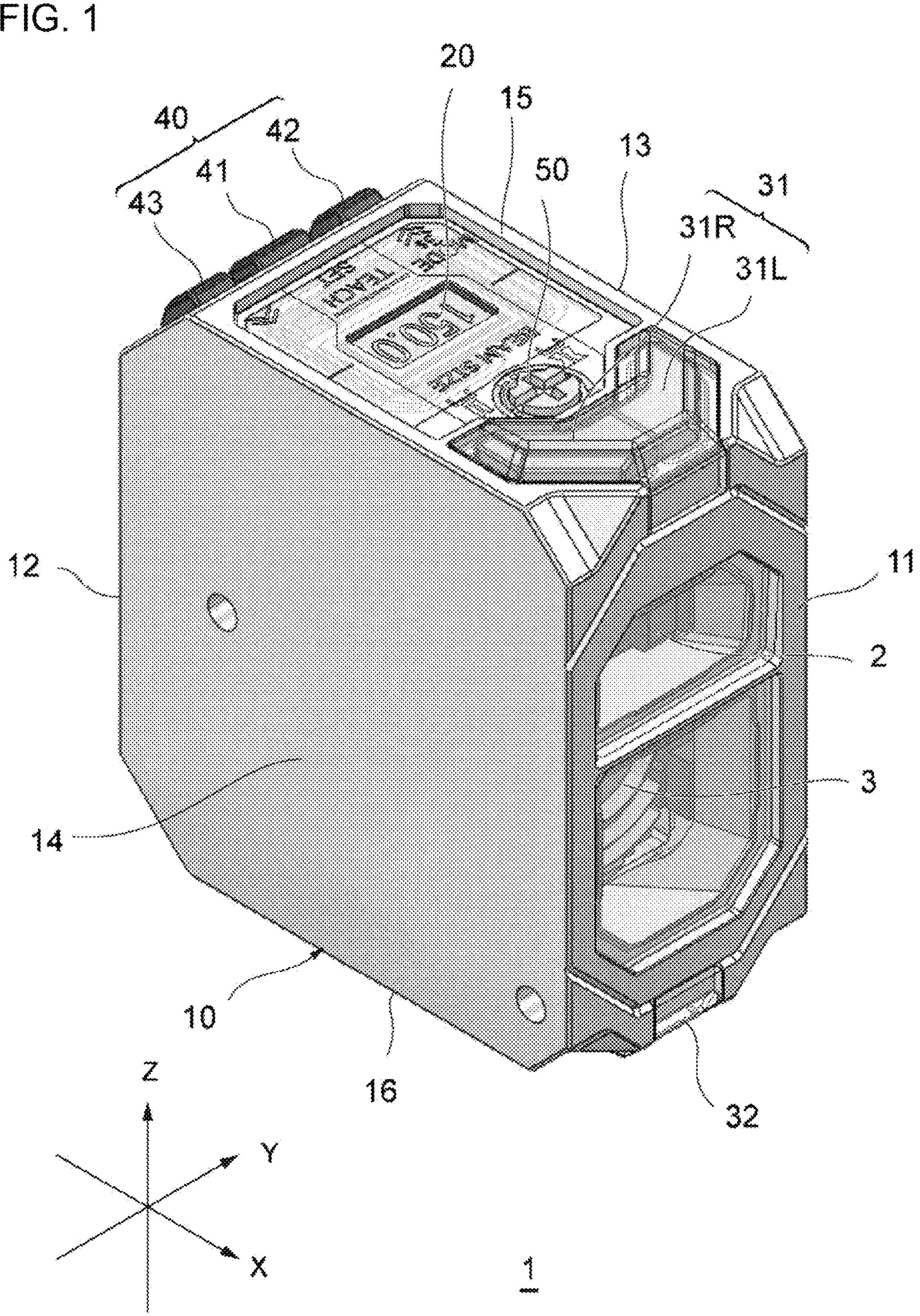
FIG. 1 is a perspective view of a photoelectric sensor according to an embodiment of the present invention.

One or more embodiments of the present invention will now be described with reference to the accompanying drawings. In the figures, the components with the same reference numerals have the same or similar structures. The components will now be described in detail with reference to the drawings. In the figures, a photoelectric sensor 1 is, for example, a time-of-flight (TOF) sensor that measures a distance based on the time taken for light emitted from a light emitter 2 in a constant cycle to be received by a light receiver 3 as reflected light. The TOF sensor includes a larger light receiver 3 and a horizontally larger housing 10 than photoelectric sensors of other types. The TOF sensor can thus include, on the housing 10, a first indicator lamp 31 and a second indicator lamp 32 that are horizontally elongated and easily visible. The photoelectric sensor 1 is not limited to the photoelectric sensor in the example in the figures, and may be a photoelectric sensor other than the TOF sensor.

Figure 2:
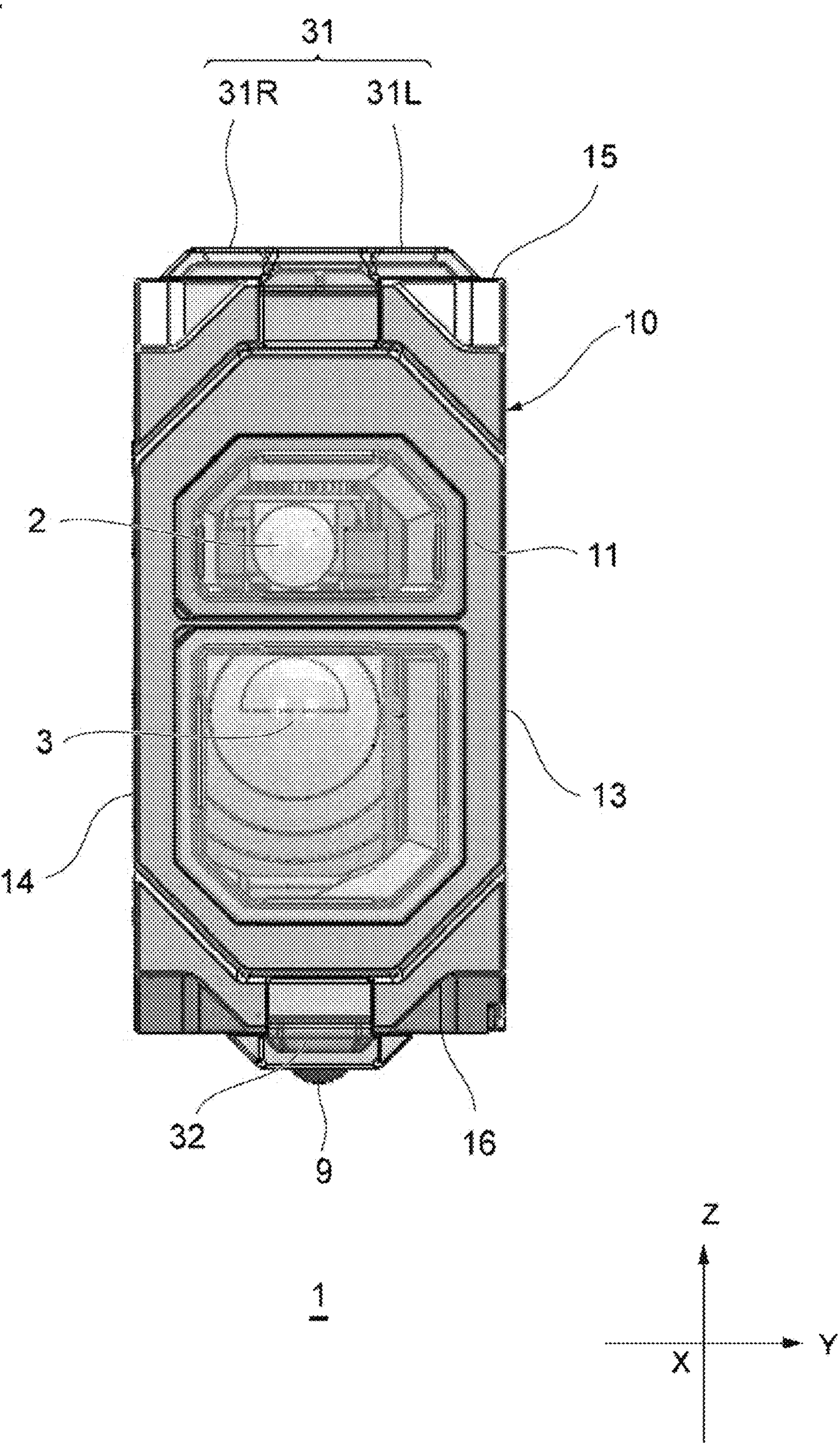
FIG. 2 is a front view of the photoelectric sensor shown in FIG. 1, showing a light emitter and a light receiver.

FIG. 1 is a perspective view of a photoelectric sensor 1 according to an embodiment of the present invention. FIG. 2 is a front view of the photoelectric sensor 1 shown in FIG. 1, showing the light emitter 2 and the light receiver 3. As shown in FIGS. 1 and 2, the photoelectric sensor 1 includes, for example, the substantially rectangular housing 10 as well as the light emitter 2, the light receiver 3, a power cable 9 (shown in FIG. 4), a display 20, a first indicator lamp (first indicator) 31, a second indicator lamp (second indicator) 32, operation buttons 40, and a trimmer 50 that are each located on or near one of surfaces 11 to 16 of the housing 10.

As shown in FIG. 1, the housing 10 has the front surface 11, the rear surface 12, the left side surface 13, the right side surface 14, the top surface 15, and the bottom surface 16. Hereafter, the direction from the rear surface 12 toward the front surface 11 is referred to as a front direction, the direction from the front surface 11 toward the rear surface 12 as a rear direction, the direction from the right side surface 14 toward the left side surface 13 as a left direction, the direction from the left side surface 13 toward the right side surface 14 as a right direction, the direction from the bottom surface 16 toward the top surface 15 as an upward direction, and the direction from the top surface 15 toward the bottom surface 16 as a downward direction. In FIG. 1, an X-direction is the front-rear direction, a Y-direction is the lateral direction, and a Z-direction is the vertical direction.

In the photoelectric sensor 1 according to the present embodiment, the housing 10 has a first surface and a second surface opposite to each other. The first indicator lamp 31 is located on the first surface, and the second indicator lamp 32 is located on the second surface opposite to the first surface. The first indicator lamp 31 located on the first surface and the second indicator lamp 32 located on the second surface can redundantly indicate information about the state of the photoelectric sensor 1.

In the example in the figure, the top surface 15 is the first surface, and the bottom surface 16 is the second surface. The combination of the first surface and the second surface is not limited to the combination in the example in the figure. The left side surface 13 may be the first surface, and the right side surface 14 may be the second surface. The front surface 11 may be the first surface, and the rear surface 12 may be the second surface. In these combinations, the first surface and the second surface are parallel to each other. Although not shown, the housing 10 may have, as the first surface, a slope connecting the top surface 15 and the front surface 11, and a slope, as the second surface, connecting the bottom surface 16 and the rear surface 12.

As shown in FIG. 2, the light emitter 2 and the light receiver 3 are located near the front surface 11 of the housing 10. The light emitter 2 includes a light source such as a laser diode and emits light toward, for example, a workpiece. The light receiver 3 includes a light-receiving element such as a complementary metal-oxide semiconductor (CMOS) image sensor, and receives light reflected from, for example, a workpiece. Boards (e.g., a light emitter-receiver board 62 and a main board 63 described later) connected to the light emitter 2 and the light receiver 3 measure the time taken for light emitted from the light emitter 2 to be reflected and return to calculate the distance between the photoelectric sensor 1 and a workpiece or another object.

Figure 3:
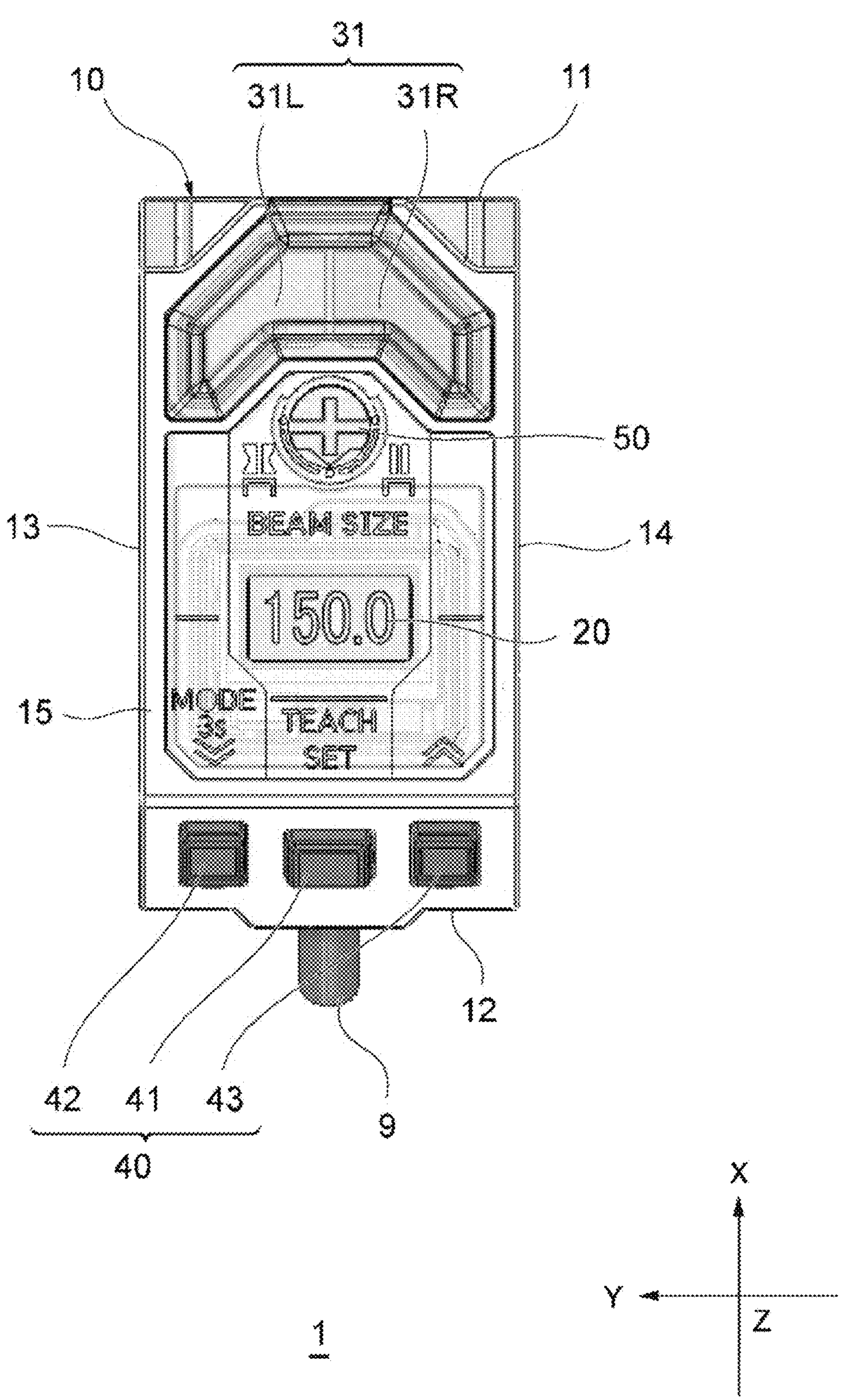
FIG. 3 is a plan view of the photoelectric sensor shown in FIG. 1, showing a first indicator lamp.

FIG. 3 is a plan view of the photoelectric sensor 1 shown in FIG. 1, showing the first indicator lamp 31. In the example in the figure, the first indicator lamp 31 includes, for example, a power-communication indicator lamp 31L that can indicate the on-off state of a power supply and an operation indicator lamp 31R that can indicate the workpiece detection state. In addition to the first indicator lamp 31, the display 20, the trimmer 50, and other components are located on the top surface 15 of the housing 10 as shown in FIG. 3.

The trimmer 50 can change the shape of a spot of light that is emitted from the light emitter 2 and strikes a workpiece as appropriate for the workpiece. In the example in the figure, the trimmer 50 is rotatable clockwise or counterclockwise to change the spot shape. For a workpiece with no recess or no through-hole, a smaller spot reduces the likelihood of erroneous operation due to ambient light and thus allows stable detection of the workpiece. For a workpiece with a recess or a through-hole, a larger spot allows stable detection of the workpiece when the light reflectance changes at the recess.

The operation buttons 40 are used for, for example, teaching for automatically setting an appropriate determination threshold in various use environments. In the example in the figure, the operation buttons 40 include a Tech button 41, a down button 42, and an up button 43. The Tech button 41 is used for, for example, the teaching and the functional operation of the photoelectric sensor 1. The down button 42 and the up button 43 are used for, for example, fine adjustment of the sensor threshold and menu change.

The display 20 is, for example, an organic electroluminescent (EL) display or a liquid crystal display that can display character strings. The display 20 displays, for example, information about the settings of the photoelectric sensor 1 that are changed with the operation buttons 40 or information about a detection value associated with reflected light received by the light receiver 3 as a character string. The character string may be in one line or in two or more lines. The display 20 may display various icons in addition to the character string.

The character string displayed on the display 20 may represent, for example, a result of a button operation to switch response time, such as Response 50 ms, Response 10 ms, or Response 1.5 ms. The character string may represent, for example, a result of an operation for performing teaching such as PUSH TEACH, Background Teach . . . , Object Teach, Success, Teach Cancel, or Teach Error. The character string may represent, for example, the state of key locking, such as LOCKED or UNLOCKED. The character string may include, for example, numerical values indicating a value that is set for the threshold, such as 500. The photoelectric sensor 1 that is a TOF sensor measures the distance to an object and compares the measured value with a predetermined threshold to determine whether the object is detected. The character string that can be displayed on the display 20 may be associated with another function. The character string may include, for example, a detection value obtained by quantifying the distance to the object, such as 150.0 or 500. The detection value may simply be a numerical value without a unit, for example, mm.

Figure 4:
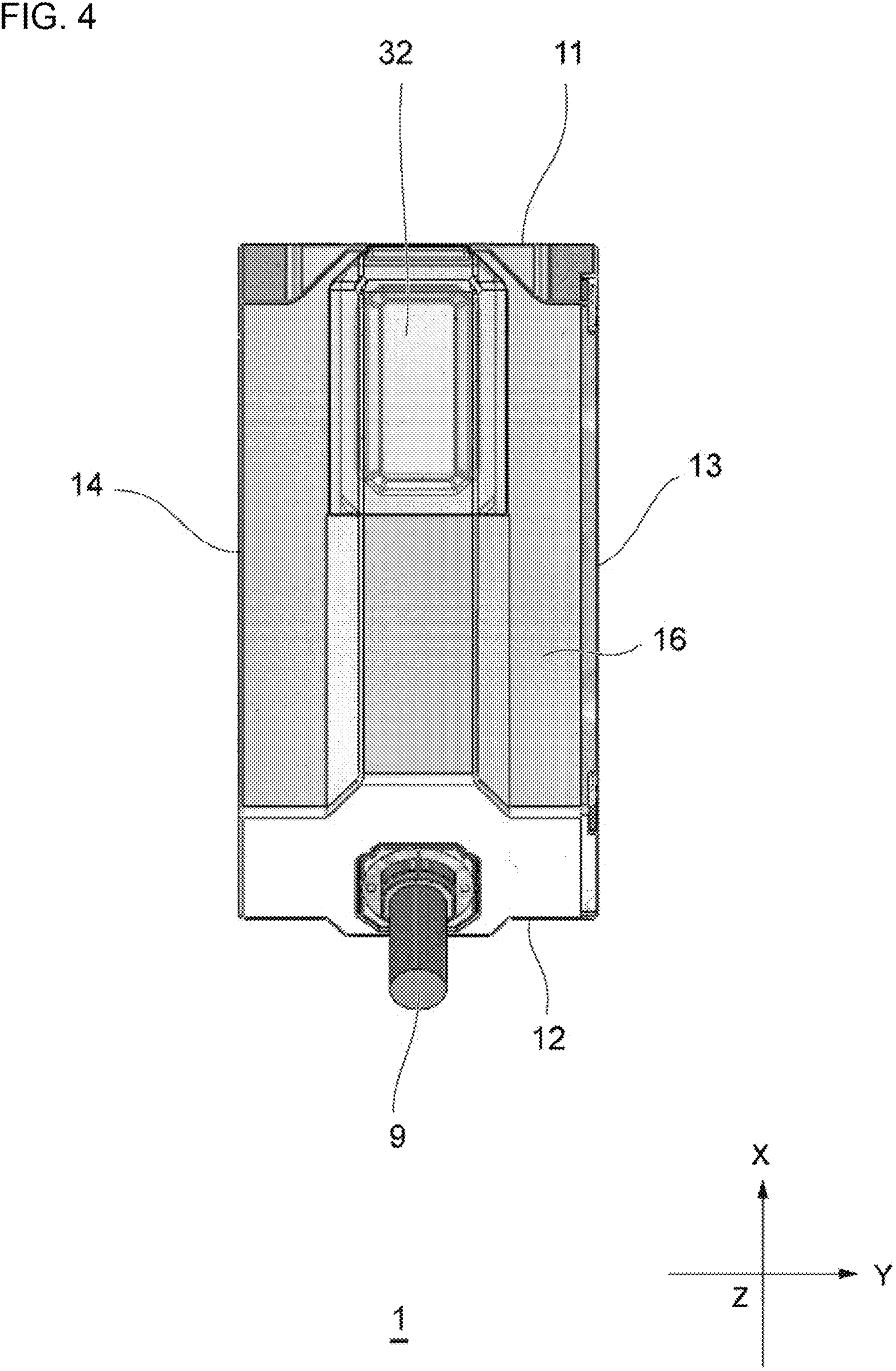
FIG. 4 is a bottom view of the photoelectric sensor shown in FIG. 1, showing a second indicator lamp.

FIG. 4 is a bottom view of the photoelectric sensor 1 shown in FIG. 1, showing the second indicator lamp 32. The second indicator lamp 32 can redundantly indicate the same information as the first indicator lamp 31. The display 20 described above displays the character string that is visible at a short distance, whereas the first indicator lamp 31 and the second indicator lamp 32 provide the information about the state of the photoelectric sensor 1 to the operator with lighting patterns and emission colors that are easily visible at a long distance. The information is, for example, at least one of the on-off state of the power supply or the workpiece detection state. The information that can be indicated by the first indicator lamp 31 and the second indicator lamp 32 will be described in detail later with reference to FIGS. 7 and 8.

As shown in FIG. 2, the first indicator lamp 31 protrudes upward from the top surface 15, and the second indicator lamp 32 protrudes downward from the bottom surface 16. Thus, the first indicator lamp 31 and the second indicator lamp 32 are easily visible in the front-rear direction and the lateral direction. The second indicator lamp 32 with a large width in the lateral direction Y is easily visible at a long distance. The second indicator lamp 32 may thus have a width larger than half the width of the bottom surface 16.

When the top surface 15 is the first surface and the bottom surface 16 is the second surface, the front surface 11 may be referred to as a third surface, the left side surface 13 as a fourth surface, and the right side surface 14 as a fifth surface. The fourth surface and the fifth surface may be parallel to each other. In the example shown in FIG. 1, the left side surface 13 has a through-hole extending through the left side surface 13 laterally, and the right side surface 14 has a through-hole extending through the right side surface 14 laterally. In this example, the photoelectric sensor 1 can be fastened to, for example, L-shaped attachment members by placing tightening screws into the through-holes and holding the photoelectric sensor 1 laterally with the L-shaped attachments. In place of the through-holes, at least one of the left side surface 13 or the right side surface 14 may have a threaded hole into which a tightening screw is screwed to fasten the photoelectric sensor 1.

The structure including the fourth and fifth surfaces used as attachment surfaces for fastening the photoelectric sensor 1 to the attachment members improves the stability of the fastened photoelectric sensor 1, compared with a structure including the first surface from which the first indicator lamp 31 protrudes and the second surface from which the second indicator lamp 32 protrudes used as the attachment surfaces. The left side surface or the right side surface can be used to attach the photoelectric sensor 1. With the left side surface or the right side surface used as the attachment surface, the first indicator lamp 31 and the second indicator lamp 32 do not interfere with the attachment members. The first indicator lamp 31 or the second indicator lamp 32 is visible in all directions. The third surface, through which measurement light is emitted and received, used as the attachment surface may affect the measurement performance. The fourth and fifth surfaces used as the attachment surfaces prevent the measurement performance from being affected.

Figure 5:
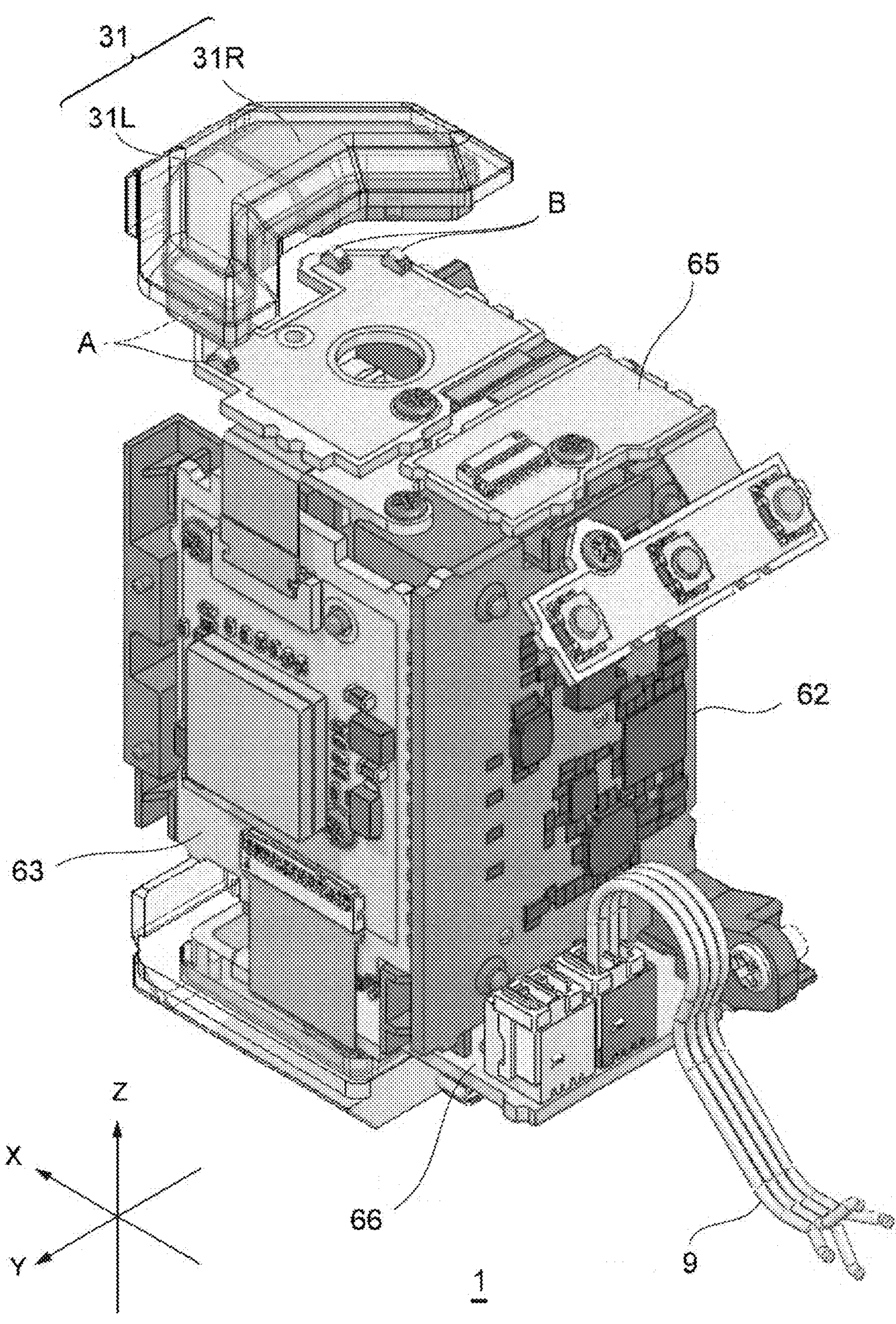
FIG. 5 is a perspective view of the photoelectric sensor shown in FIG. 1 as viewed obliquely from above, showing its internal structure.
Figure 6:
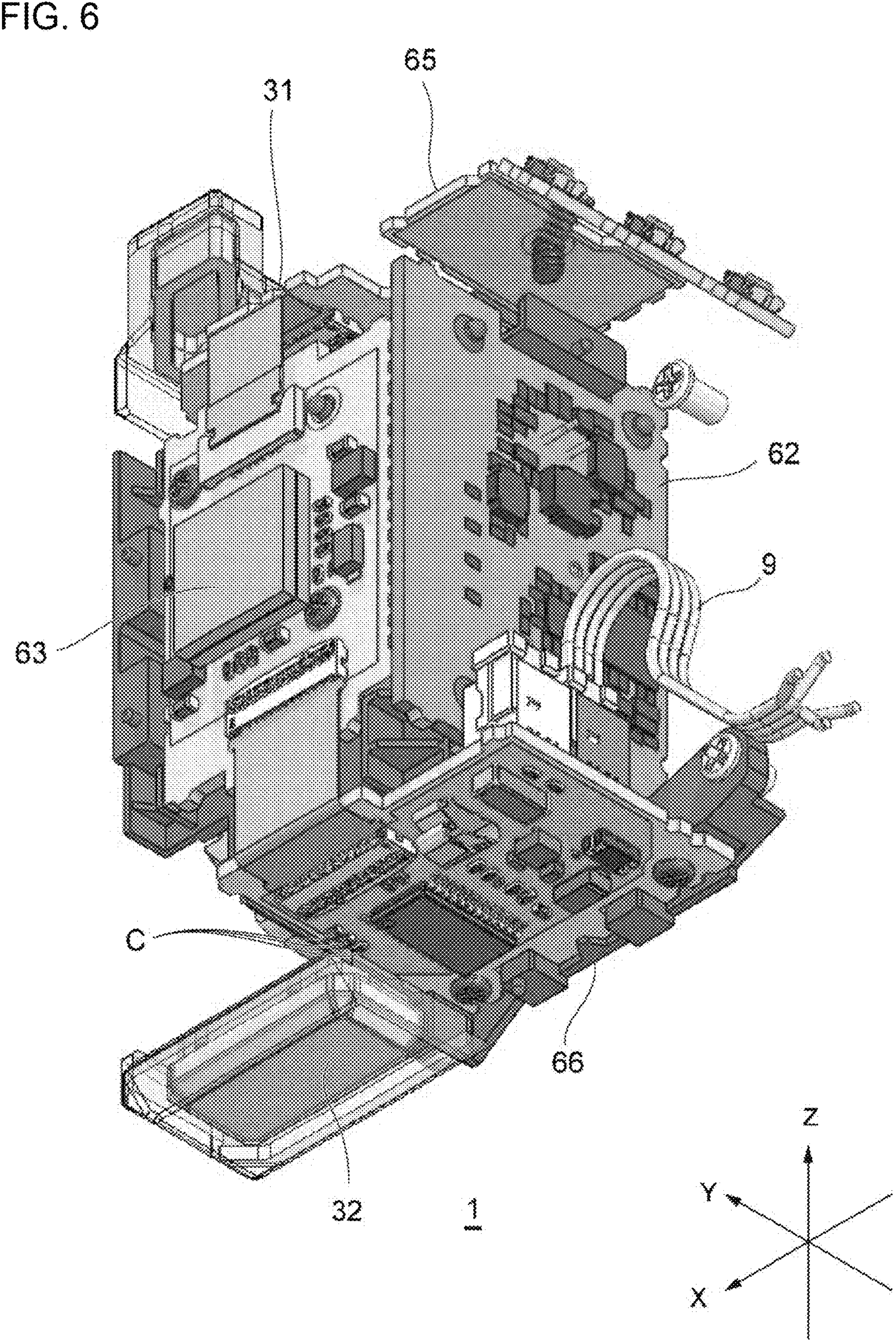
FIG. 6 is a perspective view of the photoelectric sensor shown in FIG. 1 as viewed obliquely from below, showing its internal structure.

FIG. 5 is a perspective view of the photoelectric sensor 1 shown in FIG. 1 as viewed obliquely from above, showing its internal structure. FIG. 6 is a perspective view of the photoelectric sensor 1 shown in FIG. 1 as viewed obliquely from below, showing its internal structure. As shown in FIGS. 5 and 6, the photoelectric sensor 1 includes boards accommodated in the housing 10. In the example in the figures, the photoelectric sensor 1 includes the light emitter-receiver board 62, the main board 63, a display board 65, and a power supply board 66.

In the housing 10, the light emitter-receiver board 62 is located along the rear surface 12, the main board 63 along the left side surface 13, the display board 65 along the top surface 15, and the power supply board 66 along the bottom surface 16. The light source such as a laser diode included in the light emitter 2 and a sensor such as a CMOS image sensor included in the light receiver 3 described above are mounted on the light emitter-receiver board 62. A central processing unit (CPU) that controls various light sources and the sensor is mounted on the main board 63. The display 20, the operation buttons 40, light sources A and B of the first indicator lamp 31, and other components are mounted on the display board 65. The light sources A cause the power-communication indicator lamp 31L to be turned on. The light sources B cause the operation indicator lamp 31R to be turned on. The power supply board 66 includes a power supply circuit (e.g., a DC-DC converter) for supplying power to electronic components in the housing 10. The power cable 9 is connected to the power supply board 66. The power cable 9 is mounted on a board, such as the light emitter-receiver board 62, the main board 63, the display board 65, or the power supply board 66 to supply power to the electronic components, including the laser diode, the CMOS image sensor, and the CPU, accommodated in the housing 10. In addition to the power cable 9, light sources C of the second indicator lamp 32 are mounted on the power supply board 66.

FIG. 7 is a table showing an example configuration of the first indicator lamp and the second indicator lamp that can indicate the same information redundantly. In the example in the figure, the first indicator lamp 31 and the second indicator lamp 32 each equally include two light sources. The first indicator lamp 31 and the second indicator lamp 32 each include a power-communication indicator lamp and an operation indicator lamp.

The power-communication indicator lamps in the first indicator lamp 31 and the second indicator lamp 32 are turned on as green when, for example, the power supply of the photoelectric sensor 1 is on and light is emitted from the light emitter 2, and are turned off when the power supply of the photoelectric sensor 1 is off and no light is emitted from the light emitter 2. The power-communication indicator lamps may blink based on the communication state between the photoelectric sensor 1 and an external device.

The operation indicator lamps in the first indicator lamp 31 and the second indicator lamp 32 are turned on as orange when the light receiver 3 receives light emitted from the light emitter 2 and in an output-on state in which the measured value is determined to be greater than or equal to a lower threshold, and are turned off in an output-off state other than the output-on state. The operation indicator lamps may be turned on in an output-on state in which the measured value is determined to be greater than or equal to the lower threshold and less than or equal to an upper threshold, and may be turned off in the output-off state other than the output-on state. The first indicator lamp and the second indicator lamp may redundantly indicate the information at the same time. The first indicator lamp and the second indicator lamp may redundantly indicate the information at different times.

Alternatively, an output-on state and an output-off state may be defined as a state in which the light receiver 3 receives light emitted from the light emitter 2 and a state in which the light receiver 3 does not receive light emitted from the light emitter 2, respectively. In that case, the operation indicator lamps may be turned on in the output-on state and turned off in the output-off state. An output-on state (LOW) may be determined when the measured value is less than a lower threshold, an output-on state (PASS) may be determined when the measured value is greater than or equal to the lower threshold and less than or equal to an upper threshold, and an output-on state (HIGH) may be determined when the measured value is greater than the upper threshold. The operation indicator lamps may be turned on in color that corresponds to the LOW, PASS or HIGH determination. The operation indicator lamps may be turned on in color that is associated with a failure of a head or corresponds to a setting mode.

FIG. 8 is a table showing another example configuration of the first indicator lamp and the second indicator lamp that can indicate the same information redundantly. In the example in the figure, the first indicator lamp 31 and the second indicator lamp 32 include different numbers of light sources. The first indicator lamp 31 includes a power-communication indicator lamp and an operation indicator lamp that are similar to those in the example shown in FIG. 7. The second indicator lamp 32 includes a power-communication indicator lamp that also serves as an operation indicator lamp.

The second indicator lamp 32 is turned on as orange when, for example, the power supply of the photoelectric sensor 1 is on, light is emitted from the light emitter 2, and the light receiver 3 receives the light emitted from the light emitter 2, and in the output-on state in which the measured value is determined to be greater than or equal to the lower threshold. The second indicator lamp 32 is turned on as green when the power supply of the photoelectric sensor 1 is on, light is emitted from the light emitter 2, and the light receiver 3 receives the light emitted from the light emitter 2, and in the output-off state in which the measured value is determined to be less than the lower threshold. The second indicator lamp 32 is turned off when the power supply of the photoelectric sensor 1 is off and no light is emitted from the light emitter 2.

As shown in FIG. 8, although the first indicator lamp 31 and the second indicator lamp 32 include different numbers of light sources, the first indicator lamp 31 and the second indicator lamp 32 can indicate the same information redundantly in the same manner as in the example shown in FIG. 7. The first indicator lamp and the second indicator lamp may redundantly indicate the information at the same time. The first indicator lamp and the second indicator lamp may redundantly indicate the information at different times.

The photoelectric sensor 1 may select a turn-off mode to turn off one of the first indicator lamp 31 or the second indicator lamp 32. The photoelectric sensor 1 may select a wavelength-off mode to turn off light with a specific wavelength for one of the first indicator lamp 31 or the second indicator lamp 32. FIG. 9 is a table showing an example turn-off mode to turn off one of the first indicator lamp 31 or the second indicator lamp 32. In the example in the figure, the first indicator lamp 31 is turned off. Although not shown, the second indicator lamp 32 may be turned off.

FIG. 10 is a table showing an example wavelength-off mode to turn off light with a specific wavelength for one of the first indicator lamp 31 or the second indicator lamp 32. In the example in the figure, light with the specific wavelength is turned off for the second indicator lamp 32. Although not shown, light with the specific wavelength may be turned off for the first indicator lamp 31.

The photoelectric sensor 1 may select a turn-off mode to turn off the first indicator lamp 31 and/or the second indicator lamp 32. The photoelectric sensor 1 may select a wavelength-off mode to turn off light with a specific wavelength for the first indicator lamp 31 and/or the second indicator lamp 32. FIG. 11 is a table showing an example turn-off mode to turn off the first indicator lamp 31 and/or the second indicator lamp 32, and the table specifically shows an example turn-off mode to turn off both the first and second indicator lamps 31 and 32. A turn-off mode to turn off the first indicator lamp 31 only is the same as the example shown in FIG. 9. Although not shown, it is also possible to turn off the second indicator lamp 32 only.

FIG. 12 is a table showing an example wavelength-off mode to turn off light with a specific wavelength for the first indicator lamp 31 and/or the second indicator lamp 32, and the table specifically shows an example wavelength-off mode to turn off light with a specific wavelength for both the first and second indicator lamps 31 and 32. A wavelength-off mode to turn off light with a specific wavelength only for the first indicator lamp 31 is the same as the example shown in FIG. 10. Although not shown, light with a specific wavelength may be turned off only for the first indicator lamp 31.

In the photoelectric sensor 1 according to the present embodiment with the above structure, the first indicator lamp 31 is visible from an area around the first surface of the housing 10 such as the top surface 15, and the second indicator lamp 32 is visible from an area around the second surface such as the bottom surface 16. Thus, at least one of the indicator lamps is easily visible in any direction. The first indicator lamp 31 and the second indicator lamp 32 can indicate the on-off state of the power supply or the workpiece detection state, which are to be indicated constantly, thus reliably providing such information to the operator.

The photoelectric sensor 1 according to the present embodiment with the above structure includes, in addition to the first indicator lamp 31, the second indicator lamp 32 with the light-emitting devices C of the second indicator lamp 32 mounted on the power supply board 66. The light-emitting devices C and the power supply circuit are mounted on the same board in a shared manner. This structure eliminates an additional board on which the light-emitting devices C are to be mounted and thus includes fewer components. The structure is space-saving and less costly. The first indicator lamp 31 and the second indicator lamp 32 can indicate the same information redundantly. Thus, the indicator lamp 31 or 32 located on the surface on which light from the indicator lamp may possibly turn to ambient light may be selectively turned off, or light with a specific wavelength that causes the photoelectric sensor 1 to malfunction may be selectively turned off. In the case where both light from the first surface and light from the second surface may possibly turn to ambient light, both the first and second indicator lamps may be turned off, or light with a specific wavelength that causes the photoelectric sensor to malfunction may be selectively turned off for both the first and second indicator lamps.

The above embodiments intend to facilitate understanding of the present invention and do not limit the present invention. The elements in the embodiments and their positions, materials, conditions, shapes, sizes, or other parameters are not limited to those illustrated above but may be changed as appropriate. The components in different embodiments may be partly combined or interchanged.

For example, the photoelectric sensor 1 according to the present embodiment may further include a shielding film that can block electromagnetic waves. In this case, the power supply board 66 may be covered with the shielding film, excluding the area with the light sources C of the second indicator lamp 32. In this example, although the photoelectric sensor 1 includes the second indicator lamp 32 in addition to the first indicator lamp 31, the photoelectric sensor 1 can minimize the influence of electromagnetic waves generated by the second indicator lamp 32.

For example, at least one of the turn-off mode or the wavelength-off mode in the present embodiment may be used for a known photoelectric sensor 1 without including the second indicator lamp 32. FIG. 13 is a table showing the configuration of a photoelectric sensor 1 according to a modification, without including the second indicator lamp 32, that can select the light-off mode and the wavelength-off mode. In this example, the first indicator lamp 31 that is a single indicator lamp can be turned off, or light with a specific wavelength that causes the photoelectric sensor 1 to malfunction can be selectively turned off for the first indicator lamp 31 that is a single indicator lamp. Light from the first indicator lamp 31 may be reflected from, for example, a wall or a ceiling and enter the light receiver 3 as ambient light, causing the photoelectric sensor 1 to malfunction. The configuration described above prevents such a malfunction. Although the display 20 is located on the top surface 15 that is the first surface in the above example, the arrangement of the display 20 is not limited to this example. For example, the display 20 may be located on the rear surface 12, the first indicator lamp 31 may be located on the top surface 15, the second indicator lamp 32 may be located on the bottom surface 16, and the left side surface 13 and the right side surface 14 may be the attachment surfaces.

APPENDIX

A photoelectric sensor (1), comprising:

a housing (10) having a first surface (15) and a second surface (16) opposite to the first surface (15); and a first indicator lamp (31) and a second indicator lamp (32) configured to redundantly indicate information about a state of the photoelectric sensor (1), wherein the first indicator lamp (31) is located on the first surface (15), and the second indicator lamp (32) is located on the second surface (16), the first surface (15) and the second surface (16) are parallel to each other, and the information indicated redundantly is at least one of an on-off state of a power supply or a workpiece detection state.

The invention claimed is:

1. A photoelectric sensor, comprising:

a housing having a first surface and a second surface opposite to the first surface, the first surface being a top surface with a display and/or operation buttons, and the second surface being a bottom surface to which a power cable is connectable;

the housing further comprising a third surface, the third surface being a front surface having a window through which light passes to and from the photoelectric sensor; and a first indicator lamp and a second indicator lamp configured to redundantly indicate information about a state of the photoelectric sensor, wherein:

the first indicator lamp is located on the first surface, and the second indicator lamp is located on the second surface, and the information indicated redundantly by the first indicator lamp and the second indicator lamp includes an on-off state of a power supply to the photoelectric sensor and a workpiece detection state of the photoelectric sensor.

2. The photoelectric sensor according to claim 1, wherein the first indicator lamp protrudes from the first surface, and the second indicator lamp protrudes from the second surface.

3. The photoelectric sensor according to claim 1, further comprising:

a display board on which the display is mounted; and a power supply board connectable to the power cable to supply power to an electronic component in the housing, wherein the first indicator lamp includes a light source mounted on the display board, and the second indicator lamp includes a light source mounted on the power supply board.

4. The photoelectric sensor according to claim 1, wherein the first indicator lamp and the second indicator lamp redundantly indicate the information at a same time.

5. The photoelectric sensor according to claim 1, wherein the photoelectric sensor is configured to selectively turn off the first indicator lamp and/or the second indicator lamp.

6. The photoelectric sensor according to claim 1, wherein the photoelectric sensor is configured to selectively turn off light with a specific wavelength for the first indicator lamp and/or the second indicator lamp.

7. The photoelectric sensor according to claim 1, further comprising a fourth surface and a fifth surface opposite to the fourth surface, the fourth surface being a left side surface and the fifth surface being a right side surface, wherein the fourth surface and the fifth surface are configured as attachment surfaces for fastening the photoelectric sensor to an external attachment member.

8. The photoelectric sensor according to claim 1, wherein the first indicator lamp includes a power-communication indicator lamp and an operation indicator lamp, the power-communication indicator lamp being configured to indicate the on-off state of the power supply, and the operation indicator lamp being configured to indicate the workpiece detection state of the photoelectric sensor; and the second indicator lamp is configured to alternately indicate the on-off state of the power supply and the workpiece detection state of the photoelectric sensor, redundant with the power-communication indicator lamp and the operation indicator lamp, respectively.

9. The photoelectric sensor according to claim 1, wherein the first indicator lamp includes a power-communication indicator lamp and an operation indicator lamp, the power-communication indicator lamp being configured to indicate the on-off state of the power supply, and the operation indicator lamp being configured to indicate the workpiece detection state of the photoelectric sensor; and the second indicator lamp is configured to simultaneously indicate the on-off state of the power supply and the workpiece detection state of the photoelectric sensor, redundant with the power-communication indicator lamp and the operation indicator lamp, respectively.

* * * * *